(No Model.) 2 Sheets—Sheet 1.

C. E. HEISS.
MACHINE FOR CASTING PLUMBERS' TRAPS.

No. 298,580. Patented May 13, 1884.

Witnesses
N. C. Coolies
H. W. Best

Inventor
Charles E. Heiss
By Coburn & Thacher
Attorneys (No Model.) 2 Sheets—Sheet 2.
C. E. HEISS.
MACHINE FOR CASTING PLUMBERS' TRAPS.
No. 298,580. Patented May 13, 1884.
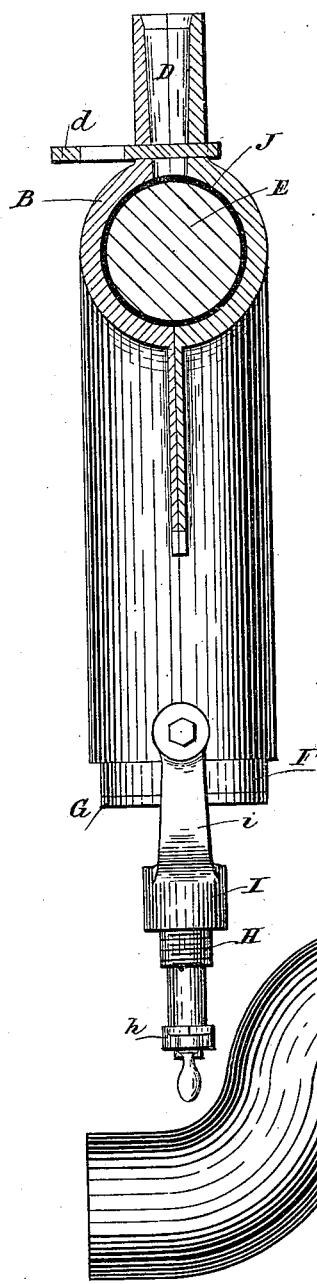
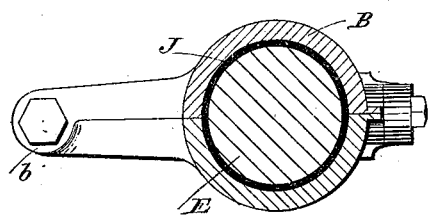
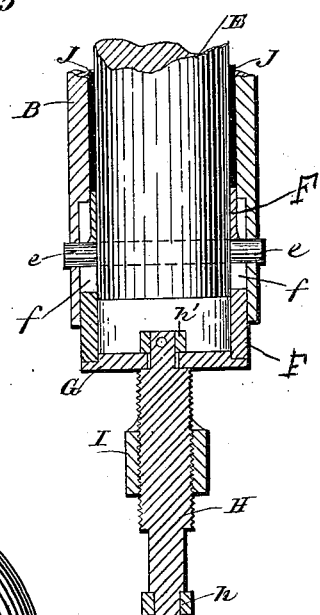
Witnesses.
Inventor
Charles E. Heiss
By Coburn & Thacher
Attorneys

UNITED STATES PATENT OFFICE.

CHARLES E. HEISS, OF CHICAGO, ILLINOIS, ASSIGNOR OF ONE-HALF TO JAMES N. RAYMOND, OF SAME PLACE.

MACHINE FOR CASTING PLUMBERS' TRAPS.

SPECIFICATION forming part of Letters Patent No. 298,580, dated May 13, 1884.

Application filed February 28, 1884. (No model.)

*To all whom it may concern:*

Be it known that I, CHARLES E. HEISS, a citizen of the United States, and residing at Chicago, in the county of Cook and State of Illinois, have invented certain new and useful Improvements in Machines for Casting Plumbers' Traps, which are fully set forth in the following specification, reference being had to the accompanying drawings, in which—

Figure 1:
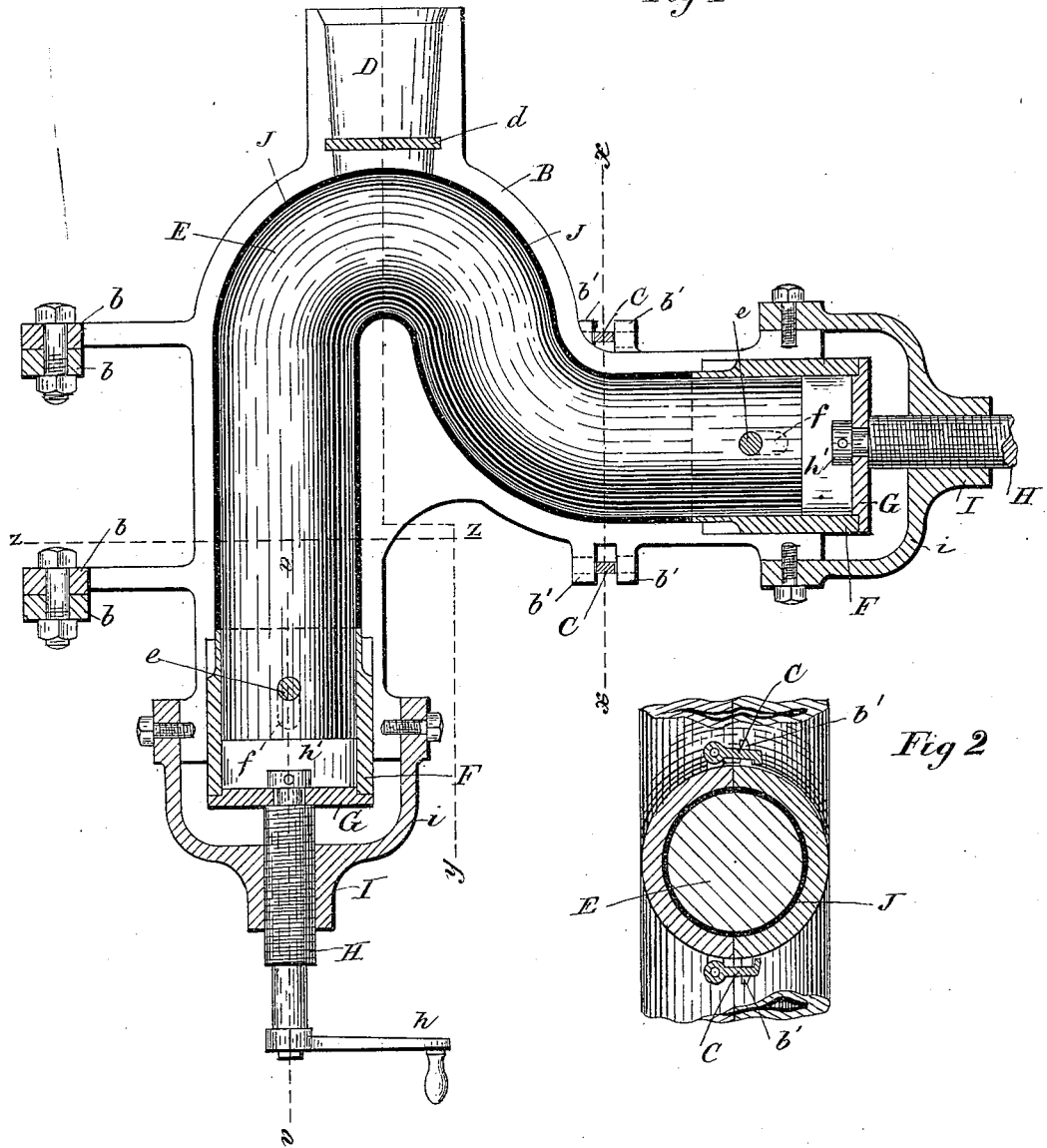
Figure 2:
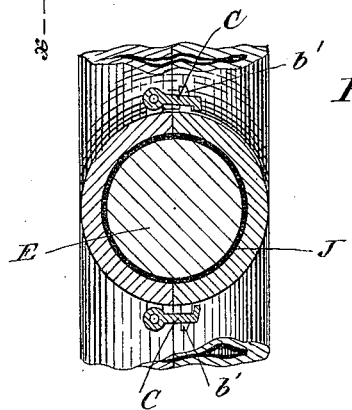

Figure 1 represents a side elevation of one-half the mold in which the trap is cast with my improvements applied, and looking toward the inside of the mold; Fig. 2, a detail section of the same taken on the line $x\,x$, Fig. 1; Fig. 3, a detail section of the same taken on the line $y\,y$, Fig. 1, the end of the mold and appliances being shown in full; Fig. 4, a detail section of the same taken on the line $z\,z$, Fig. 1; Fig. 5, a detail section of the same taken on the line $v\,v$, Fig. 1; and Fig. 6, an elevation of the completed cast trap.

My present invention relates to mechanism applied to the mold in which the trap is cast, whereby pressure is applied to the molten lead after it is flowed into the mold.

The object of the invention is to make the metal of the trap dense and homogeneous throughout, to prevent shrinkage, and to obtain in a cast trap all the advantages which belong to one that is drawn.

I will proceed to describe in detail the mechanism by which I have carried out my invention in practical form in one way, and will then point out definitely in the claims the special improvements which I believe to be new and wish to protect by Letters Patent.

My invention may be applied to a trap of any form that can be cast in a mold, and I do not wish to be understood as limiting myself to any particular form of the trap.

In the drawings I have shown in Fig. 6 a trap, A, of an ordinary and well-known form, and have shown the mold and other parts of the mechanism of a form and construction adapted to cast this trap.

The mold B, as shown in the drawings, is shaped to form a trap like that shown in Fig. 6 of the drawings, and, as usual, is made in two parts or sections, which are fastened together by the hinge-joint $b$, as usual, so that the mold may be opened. The two sections of the mold are fastened together, when ready for filling, by means of links C, provided with T-heads, and pivoted to lugs on one of the sections, and shutting into forked lugs $b'$ on the other section, the outer faces of which are beveled, so that the two sections are drawn tightly together by forcing the heads of the links down on the outside of these forked lugs. An ingate, D, is provided at the curved portion of the mold, near the middle of its length, and in it is fixed a sliding valve or cut-off, $d$, which has an opening corresponding to the opening of the ingate, and is arranged so that the latter may be entirely closed, or opened wholly or in part, at pleasure. A core, E, of any ordinary material, is provided, and adapted to the mold in the usual way, and at each end is provided with pins $e$, on each side thereof, which extend outward through the mold. A sleeve, F, is inserted in each end of the mold, being adapted to receive and fit around the respective ends of the core. The extremities of the mold are cut out somewhat, to permit the thickening or enlargement of this sleeve for the most of its length; but the extreme inner portion thereof is thin, and exactly fitting the space between the core and the mold in which the metal is flowed. These sleeves support the core, and are provided with elongated slots $f$ on each side thereof, through which the core-pins pass. The sleeves are inserted loosely in the ends of the mold, and obviously may be moved back and forth therein, the elongated slots permitting this movement on the pins. A follower, G, is fitted to the outer end of each of these sleeves, and to this follower I apply mechanism of any suitable kind by which it may be pressed forward, thereby driving the sleeve forward into the mold. The device which I have shown in the drawings for accomplishing this is a screw, H, which is inserted in a nut, I, fastened to the respective ends of the mold by means of forked arms $i$. A crank, $h$, is applied to the outer end of the screw, by means of which it is turned, thereby setting it back and forth in the nut whenever desired. The inner end of the screw is cut down and passed through a hole in the follower, and secured in place by a pin and collar, $h'$, or any other suitable device on the other side of this follower. Obviously the movement of the screw lengthwise will carry the follower with it in the same direction.

The operation of these devices is as follows: The core is placed within the mold, as usual, the sleeves applied to each end, and the pins inserted, passing through mold, sleeve, and core. The sleeves are adjusted to their farthest outward position—that is, with the pins at the inner ends of the slots in the sleeves, as shown in Figs. 1 and 5 of the drawings, and in this position the inner edges of the sleeves just enter the narrow space between the core and mold beyond the cut-away or enlarged opening in the latter at the ends. The mold is closed and secured, and the metal is then poured in until the mold is filled, when the valve is moved to close the ingate. The metal J will of course fill the space between the core and mold, and be stopped at each end by the inner ends of the sleeves. The screws at each end of the mold are now turned in a direction to carry them inward, thereby bringing pressure to bear upon the ends of the sleeves, which will force them inward, and as the sleeves closely fit the space between the core and mold this pressure will be transmitted at once to the metal within the mold and at each end of the latter. All shrinkage of the metal as it cools will thus be taken up and the casting will be dense and homogeneous throughout.

It is well known that these lead traps as heretofore cast have been liable to serious defects, caused by shrinkage, the ends being especially weak and unsuitable for working in the usual way. All these defects are obviated by the use of my invention, and an article is produced which is just as strong and has all the advantages of the drawn trap, and at the same time can be produced more cheaply.

It will be seen that the movable sleeves act also as supporters to the core, serving to hold the ends of the latter in a fixed and accurate position, from which they cannot escape, and, being applied at both ends, the core is held within the mold in the exact position desired by means of the sleeves in connection with the pins.

It must be obvious that the device for applying pressure to the sleeves is not material. I have described and shown one means which I have found very convenient and satisfactory; but any mechanism which is suitable for this purpose may be applied without departing from the principle of my invention; hence I do not wish to be understood as limiting myself to the particular follower herein shown and described, or to the screw for applying pressure to the sleeves.

It will also be obvious that with this mechanism for applying pressure to the molten metal it is necessary to close the ingate, and so a valve or cut-off is an important feature, though it need not be constructed precisely as I have shown and described. As already stated, I do not limit myself to the form of trap here shown and described, but intend to apply the mechanism to a mold for any form of trap. The mold of course has the usual vents.

Having thus described my invention, what I claim as new, and desire to secure by Letters Patent, is—

1. A mold for casting plumbers' traps, having an enlarged inner diameter at its ends, a core extending into the enlarged cavity at each end, a sleeve at each end, arranged to move back and forth on the core, and having an inner portion of thickness suitable to fit around the core in the smallest part of the mold, and an outer portion of thickness to fit in the enlarged part of the mold and support the core, and mechanism whereby pressure may be applied to the sleeves, to force them inward, all in combination, substantially as and for the purpose described.

2. The mold B, in combination with the core E, the sleeves F, provided with slots $f$, and the pins $e$, substantially as and for the purposes set forth.

3. The mold B, in combination with the core E, the sleeves F, the follower G, the screw H, and a suitable fixed bearing for the screw, substantially as and for the purposes set forth.

CHARLES E. HEISS.

Witnesses:
 THOMAS H. PEASE,
 G. E. FAULKNER.